(12) United States Patent
Kroeger et al.

(10) Patent No.: US 11,760,642 B2
(45) Date of Patent: Sep. 19, 2023

(54) GRAPHENIC CARBON NANOPARTICLES HAVING A LOW POLYAROMATIC HYDROCARBON CONCENTRATION AND PROCESSES OF MAKING SAME

(71) Applicant: RAYMOR INDUSTRIES INC., Boisbriand (CA)

(72) Inventors: Jens Kroeger, Montréal (CA); Nicholas Larouche, Montréal (CA); Frédéric Larouche, Île Bizard (CA); Matthieu Balmayer, Montréal (CA)

(73) Assignee: RAYMOR INDUSTRIES INC., Boisbriand (CA)

( * ) Notice: Subject to any disclaimer, the term of this patent is extended or adjusted under 35 U.S.C. 154(b) by 0 days.

(21) Appl. No.: 18/111,508

(22) Filed: Feb. 17, 2023

(65) Prior Publication Data

US 2023/0192497 A1    Jun. 22, 2023

Related U.S. Application Data

(63) Continuation of application No. 17/866,560, filed on Jul. 18, 2022, now Pat. No. 11,608,271, which is a
(Continued)

(51) Int. Cl.
*C01B 32/196* (2017.01)

(52) U.S. Cl.
CPC ........ *C01B 32/196* (2017.08); *C01B 2204/32* (2013.01); *C01P 2002/82* (2013.01); *C01P 2006/11* (2013.01); *C01P 2006/12* (2013.01)

(58) Field of Classification Search
CPC . C01B 32/196; C01B 2204/32; C01B 32/184; C01B 32/182; C01B 2204/20;
(Continued)

(56) References Cited

U.S. PATENT DOCUMENTS 4,138,471 A    2/1979  Amond et al.
8,034,316 B2  10/2011  Yurovskaya et al.
(Continued)

FOREIGN PATENT DOCUMENTS

JP    2005082453    3/2005
JP    2007290957    11/2007
(Continued)

OTHER PUBLICATIONS

Joselevich et al., "Carbon Nanotube Synthesis and Organization", A. Jorio, G. Dresselhaus, M. S. Dresselhaus (Eds.): Carbon Nanotubes, Topics Appl. Physics 111, 101-164 (2008). (The year of publication is sufficiently earlier than the effective U.S. filing date so that the particular month of publication is not an issue).
(Continued)

*Primary Examiner* — Daniel C. McCracken
(74) *Attorney, Agent, or Firm* — Bereskin & Parr LLP/S.E.N.C.R.L., s.r.l.

(57) ABSTRACT

Provided are graphene nanosheets having a polyaromatic hydrocarbon concentration of less than about 0.7% by weight. Also provided are Graphene nanosheets having a polyaromatic hydrocarbon concentration of about 0.01% to about 0.5%.

20 Claims, 5 Drawing Sheets

Related U.S. Application Data continuation of application No. 16/484,885, filed as application No. PCT/CA2018/050145 on Feb. 8, 2018, now Pat. No. 11,420,873.

(60) Provisional application No. 62/457,472, filed on Feb. 10, 2017.

(58) Field of Classification Search
CPC ..... C01B 32/186; C01B 32/188; C01B 32/19; C01B 32/192; C01B 32/194; C01B 32/198; C01B 2204/00; C01B 2204/02; C01B 2204/04; C01B 2204/06; C01B 2204/065; C01B 2204/22; C01B 2204/24; C01B 2204/26; C01B 2204/28; C01B 2204/30; C01B 32/20; C01B 32/205; C01B 32/21; C01B 32/215; C01B 32/22; C01B 32/225; C01B 32/23; C01P 2002/82; C01P 2006/11; C01P 2006/12
See application file for complete search history.

(56) References Cited

U.S. PATENT DOCUMENTS

| | | | |
|---|---|---|---|
| 8,110,026 B2 | 2/2012 | Prud'Homme et al. | |
| 8,486,363 B2 | 7/2013 | Hung et al. | |
| 8,486,364 B2 | 7/2013 | Vanier et al. | |
| 8,710,136 B2 | 4/2014 | Yurovskaya et al. | |
| 9,221,688 B2 | 12/2015 | Hung et al. | |
| 10,793,440 B2 | 10/2020 | Kroeger et al. | |
| 10,843,925 B1 | 11/2020 | Kroeger et al. | |
| 11,420,873 B2 * | 8/2022 | Kroeger | C01B 32/196 |
| 11,608,271 B2 * | 3/2023 | Kroeger | C01B 32/184 |
| 2003/0031620 A1 | 2/2003 | Harutyunyan et al. | |
| 2008/0159947 A1 | 7/2008 | Yurovskaya et al. | |
| 2010/0096595 A1 | 4/2010 | Prud'Homme et al. | |
| 2010/0301212 A1 | 12/2010 | Dato et al. | |
| 2011/0313094 A1 | 12/2011 | Yurovskaya et al. | |
| 2013/0084236 A1 | 4/2013 | Hung et al. | |
| 2013/0084237 A1 | 4/2013 | Vanier et al. | |
| 2014/0227165 A1 | 8/2014 | Hung et al. | |
| 2014/0313636 A1 | 10/2014 | Tour et al. | |
| 2015/0259211 A9 | 9/2015 | Hung et al. | |
| 2023/0039687 A1 | 2/2023 | Kroeger et al. | |

FOREIGN PATENT DOCUMENTS

| | | |
|---|---|---|
| WO | 2012147054 | 11/2012 |
| WO | 2013166414 | 11/2013 |
| WO | 2015189643 | 12/2015 |

OTHER PUBLICATIONS

Kim et al., "Continuous Synthesis of Nanostructured Sheetlike Carbons by Thermal Plasma Decomposition of Methane", IEEE Transactions on Plasma Science, vol. 35, No. 2, Apr. 2007.

Kim et al., "Size-Controllable and Low-Cost Fabrication of Graphene Quantum Dots Using Thermal Plasma Jet", American Chemical Society, vol. 8, No. 5, pp. 4190-4196, May 2014.

Lemmon et al., "Viscosity and Thermal Conductivity Equations for Nitrogen, Oxygen, Argon, and Air", International Journal of Thermophysics, vol. 25, No. 1, Jan. 2004.

Pristavita et al., "Carbon Nanoparticle Production by Inductively Coupled Thermal Plasmas: Controlling the Thermal History of Particle Nucleation", Plasma Chem Plasma Process, Sep. 2011, 31:851-866.

Pristavita et al., "Carbon Blacks Produced by Thermal Plasma: the Influenve of the Reactor Geometry on the Product Morphology", Plasma Chem Plasma Process, Feb. 2010, 30:267-279.

Zhand et al., "Preparation of few-layer graphene nanosheets by radio-frequency induction thermal plasma", Carbon 86, Jan. 2015, 38-45.

Amirov et al., "Direct Synthesis of Porous Multilayer Graphene Materials Using Thermal Plasma at Low Pressure", Journal of Nanomaterials, Research Article, vol. 2015 (April), Article ID 724508, 6 pages.

Brunauer et al., "Adsorption of Gases in Multimolecular Layers", Contribution from the Bureau of Chemistry and Soils and George Washington University, Feb. 1938, 309-319.

Wang et al., "Low-cost and large-scale synthesis of graphene nanosheets by arc discharge in air", Nanotechnology 21 (Apr. 1, 2010), pp. 1-4.

Dato et al., "Substrate-Free Gas-Phase Synthesis of Graphene Sheets", Nano Letters, Jun. 5, 2008, vol. 8, No. 7 (2012-2016).

Tatarova et al., "Microwave plasma based single step method for free standing graphene synthesis at atmospheric conditions", Applied Physics Letters 103, 134101 (Sep. 24, 2013).

English Translation—Machine Translation of JP2005082453A, "Method of Purifying Fullerene", published on Mar. 31, 2005.

English Translation—Machine Translation of JP2007290957A, "Carbon Material and its Production Method", published on Nov. 8, 2007.

* cited by examiner

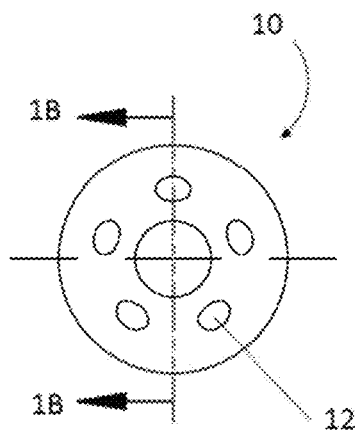
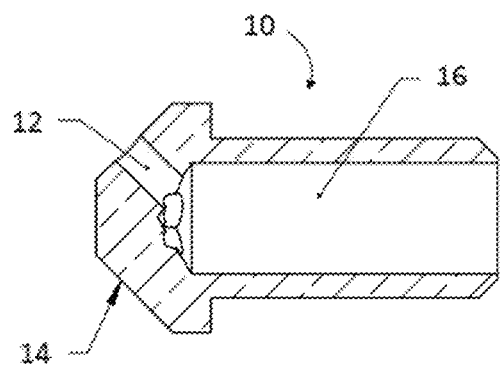
Fig. 2A　　　　　　　　　　　Fig. 2B
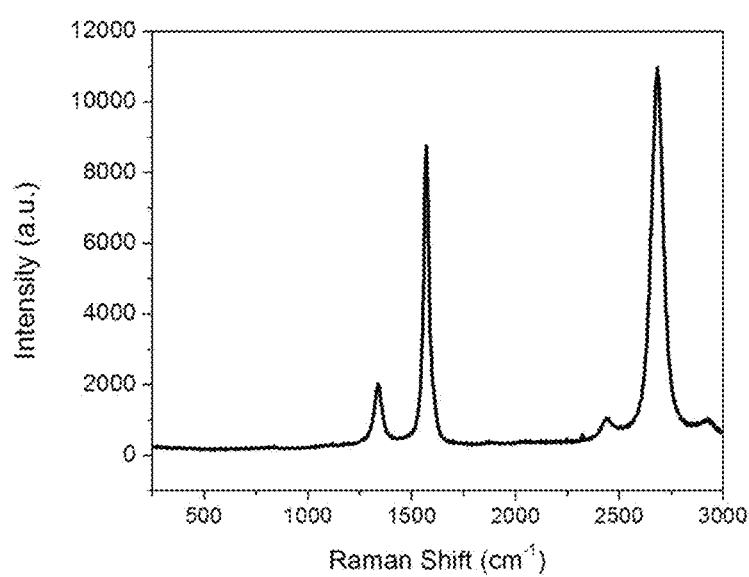
Fig. 3

GRAPHENIC CARBON NANOPARTICLES HAVING A LOW POLYAROMATIC HYDROCARBON CONCENTRATION AND PROCESSES OF MAKING SAME

CROSS-REFERENCE TO RELATED APPLICATIONS

The present application is a continuation of U.S. Ser. No. 17/866,560 filed on Jul. 18, 2022, that is a continuation of U.S. Ser. No. 16/484,885 filed on Aug. 9, 2019 (issued as U.S. Pat. No. 11,420,873 on Aug. 23, 2022) that is a 35 USC 371 national stage entry of PCT/CA2018/050145 filed on Feb. 8, 2018, and which claims priority to U.S. 62/457,472 filed on Feb. 10, 2017. These documents are hereby incorporated by reference in their entirety.

FIELD OF THE DISCLOSURE

The present disclosure relates to the field of graphenic carbon nanoparticles and more particularly to graphene nanosheets having a reduced content in polyaromatic hydrocarbons (PAHs) and processes thereof.

BACKGROUND OF THE DISCLOSURE

Commercially available graphene can be split into 3 categories: single-layer graphene from chemical vapour deposition (CVD) on a substrate, multi-layer graphene from graphite exfoliation and few-layer graphene nanosheets produced using a plasma torch. While CVD graphene possesses the qualities of true single-layer graphene, it will likely never be produced in quantities necessary for bulk applications. Exfoliated multi-layer graphene, while being available in bulk quantities suitable for energy storage, filler and conductive ink applications, does not possess the specifications or spectral signature of mono-layer graphene nor can it approach the electrical conductivity values expected for mono-layer graphene. Few-layer and multilayer graphene, also referred to herein as graphene nanosheets, are a focus of the present disclosure.

Few-layer graphene nanosheets can be produced in bulk quantities and with a signature (Raman spectra and specific surface area) similar to that of monolayer graphene by plasma torch processes such as described in U.S. Pat. Nos. 8,486,363, 8,486,364 and 9,221,688, U.S. provisional application No. U.S. 62/437,057 and PCT application no. WO 2015189643 A1, which are incorporated herein by reference in their entirety. However, the production of graphene nanosheets by plasma processes leads to the formation of polyaromatic hydrocarbons (PAHs) as a by-product, usually with a concentration in the range of about 0.1 to about 2% by weight. In such processes, PAHs form on the surface of the few-layer graphene nanosheets.

PAHs are undesired compounds present on carbon-based powders produced from the pyrolysis of gaseous hydrocarbon precursors or when a mixture of hydrogen precursor and carbon precursor are simultaneously present during the production of carbon-based powders. PAHs encompass many compounds composed primarily of carbon and hydrogen ($C_xH_y$) and where carbon is mostly arranged in aromatic ring configuration with $sp^2$ hybridization. PAHs can also contain small fractions of oxygen or nitrogen or other atoms. PAHs can be noxious and carcinogenic as well as pose a serious hazard to humans handling carbon nanoparticles containing PAHs as well as consumers using products that contain PAHs (See Borm P J, et. al., Formation of PAH-DNA adducts after in vivo and vitro exposure of rats and lung cells to different commercial carbon blacks, Toxicology and Applied Pharmacology, 2005 Jun. 1; 205(2): 157-167.). As a consequence, regulations exist to limit the fraction of PAHs present in manufactured carbon powder (as an example, the EU directive 2007/19/EC establishes a maximum Benzo(a)pyrene content of 0.25 mg/kg in carbon black). Moreover, the presence of PAH on carbon surfaces can have detrimental effects on the performance in energy storage applications by blocking small pores and therefore by decreasing the specific surface area.

In addition, the Harmonized System (HS), established by the World Custom Organization (WCO), classifies many PAHs as Category 1B carcinogenic, mutagenic or reprotoxic (CMR) substances. Accordingly the new European REACH Annex XVII has limited the concentration of PAH in consumer products to 0.0001% by weight for (or 1 mg/kg).

Wet chemistry processes to wash or rinse off PAHs from carbon particles are known. Such processes, such as Soxhlet extraction, generally require the use of toxic non-polar solvents such as toluene, since the solubility of PAHs is very limited. However, such processes involving toxic solvents lead to large amounts of waste formed by solvents contaminated with PAHs. Wet-chemistry PAH removal processes thus have a negative environmental impact and add a large cost to the PAH-free end product. It is thus highly desirable to develop a simple gas-phase (dry) method to remove PAHs from carbon nanoparticles and graphene nanosheets and especially plasma-grown graphene nanosheets that is also economical and does not involve solvent waste. The use of liquid-phase processes also leads to significant densification of the carbon powder once dried. Such higher density may be detrimental to further processing such as dispersion, for example.

It is thus highly desirable to produce directly, using a plasma process, and without post-processing, graphene nanoplatelets containing very low levels of PAHs. Indeed, while it is possible to wash away PAHs using wet chemistry processes such as Soxhelet extraction, this adds much cost to the final PAH-free graphene material.

THE SUMMARY

The present disclosure relates to graphene nanosheets with low amounts of polyaromatic hydrocarbons. These graphene nanosheets do not require going through a liquid-phase or wet-chemistry process and thus display a lower tap density. The present disclosure further relates to processes of making the graphene nanosheets of the present disclosure.

There is provided in an aspect graphene nanosheets having a polyaromatic hydrocarbon concentration of less than about 0.7% by weight.

There is provided in another aspect graphene nanosheets having a polyaromatic hydrocarbon concentration of less than about 0.7% by weight and a tap density of less than about 0.08 g/cm$^3$, as measured by ASTM B527-15 standard.

Also provided in another aspect is a process for removing volatile impurities from graphene nanosheets, comprising heating the graphene nanosheets under a reactive atmosphere, at a temperature of at least about 200° C.

In another aspect, there is provided a process for increasing the specific surface area (B.E.T.) of graphene nanosheets, wherein the process comprises heating the graphene nanosheets under oxidative atmosphere, at a temperature of at least about 200° C.

In another aspect, there is provided a process for dispersing graphene nanosheets in a solvent, wherein the process comprises heating the graphene nanosheets under oxidative atmosphere, at a temperature of at least about 200° C. and dispersing the graphene nanosheets in a solvent.

In another aspect, there is provided a process for improving the electrical conductivity of graphene nanosheets, wherein the process comprises heating the graphene nanosheets under oxidative atmosphere, at a temperature of at least about 200° C.

There is provided herein in an aspect a plasma process for producing graphene nanosheets comprising:
  injecting into a thermal zone of a plasma a carbon-containing substance at a velocity of at least 60 m/s standard temperature and pressure (STP) to nucleate the graphene nanosheets, and quenching the graphene nanosheets with a quench gas of no more than 1000° C., and
  further heating the graphene nanosheets under reactive atmosphere, at a temperature of at least about 200° C.

In another aspect, there is provided herein a plasma process for producing graphene nanosheets comprising:
  injecting into a thermal zone of a plasma a carbon-containing substance at a velocity of at least 60 m/s STP to nucleate the graphene nanosheets, and quenching the graphene nanosheets with a quench gas of no more than 1000° C., thereby producing the graphene nanosheets with a Raman G/D ratio greater than or equal to 3 and a 2D/G ratio greater than or equal to 0.8, as measured using an incident laser wavelength of 514 nm, and
  further heating the graphene nanosheets under reactive atmosphere, at a temperature of at least about 200° C.

In a further aspect, there is provided herein a plasma process for producing graphene nanosheets, comprising:
  injecting into a thermal zone of a plasma a carbon-containing substance at a velocity of at least 60 m/s STP and at a quench gas to carbon ratio of at least 75 standard liter per minute (slpm) of quench gas per mole of carbon injected per minute, thereby producing the graphene nanosheets, and
  further heating the graphene nanosheets under reactive atmosphere, at a temperature of at least about 200° C.

In a further aspect, there is provided herein a plasma process for producing graphene nanosheets, comprising:
  injecting into a thermal zone of a plasma a carbon-containing substance at a velocity of at least 60 m/s STP and at a quench gas to supplied plasma torch power ratio of at least 1.25 slpm of quench gas per kW of supplied plasma torch power, thereby producing the graphene nanosheets, and
  further heating the graphene nanosheets under reactive atmosphere, at a temperature of at least about 200° C.

In yet another aspect, there is provided herein a plasma process for producing graphene nanosheets, comprising:
  injecting into a thermal zone of a plasma a carbon-containing substance, the injecting of the carbon-containing substance being carried out using a plurality of jets at a velocity of at least 60 m/s STP and directed such that the injected carbon-containing substance is distributed radially about a torch axis and diluted before reaching a quench gas, thereby producing the graphene nanosheets with a Raman G/D ratio greater than or equal to 3 and a 2D/G ratio greater than or equal to 0.8 as measured using an incident laser wavelength of 514 nm, and
  further heating the graphene nanosheets under reactive atmosphere, at a temperature of at least about 200° C.

Another aspect herein provided is a plasma process for producing graphene nanosheets, comprising:
  injecting into a thermal zone of a plasma a carbon-containing substance at a velocity of at least 60 m/s STP and at a quench gas to supplied plasma torch power ratio of at least 1.25 slpm of quench gas per kW of supplied plasma torch power, thereby producing the graphene nanosheets at a rate of at least 120 g/h, and
  further heating the graphene nanosheets under reactive atmosphere, at a temperature of at least about 200° C.

Another aspect herein provided is a plasma process for producing graphene nanosheets, comprising:
  injecting into a thermal zone of a plasma a carbon-containing substance, the injecting of the carbon-containing substance being carried out using a plurality of jets at a velocity of at least 60 m/s STP and directed such that the injected carbon-containing substance is distributed radially about a torch axis and diluted before reaching a quench gas, thereby producing the graphene nanosheets at a rate of at least 120 g/h, and
  further heating the graphene nanosheets under reactive atmosphere, at a temperature of at least about 200° C.

A further aspect herein provided is a plasma process for producing graphene nanosheets, comprising:
  injecting into a thermal zone of a plasma a carbon-containing substance at a velocity of at least 60 m/s, thereby producing the graphene nanosheets at a rate of at least 2 g/kWh of supplied plasma torch power, and
  further heating the graphene nanosheets under reactive atmosphere, at a temperature of at least about 200° C.

In a further aspect, there is provided herein a plasma process for producing graphene nanosheets, comprising:
  injecting into a thermal zone of a plasma a carbon-containing substance at a velocity of at least 60 m/s and with a supplied plasma torch power greater than 35 kW, thereby producing the graphene nanosheets at a rate of at least 80 g/h, and
  further heating the graphene nanosheets under reactive atmosphere, at a temperature of at least about 200° C.

In a further aspect, there is provided herein a plasma process for producing graphene nanosheets, comprising:
  injecting into a thermal zone of a plasma natural gas or methane at a velocity of at least 60 m/s STP to nucleate the graphene nanosheets, and quenching the graphene nanosheets with a quench gas, and further
  heating the graphene nanosheets under reactive atmosphere, at a temperature of at least about 200° C.

It has been found that the processes described herein are effective for removing polyaromatic hydrocarbons thus allowing for economical and large-scale production of graphene nanosheets that have very low PAH content and are safe to handle and to integrate into end-user applications. Furthermore, the processes described herein are effective for cleaning the surface of the graphene nanosheets, increasing their specific surface area and improving the ability of electrons to flow freely along their surfaces. The processes are thus effective for improving the electrical conductivity properties of the graphene nanosheets.

The products and processes described herein are effective for increasing the ability of the graphene nanosheets to be dispersed in solvents, thereby increasing their usability and performance in conductive applications where percolation at low loadings is advantageous.

BRIEF DESCRIPTION OF THE DRAWINGS

In the following drawings, which represent by way of example only, various embodiments of the disclosure:

FIG. 2A (bottom view) and FIG. 2B (cross sectional view taken along the line 1B-1B of FIG. 1A) show a five (5)-hole shower head-type nozzle used to inject the carbon-containing substance.

FIG. 3 is a plot of a Raman spectra obtained with an incident wavelength of 514 nm from a sample produced using a multi-hole injector where, for each of these injector holes, the injection velocity was greater or equal than 60 m/s STP (standard temperature and pressure) and the injection angle is 25 degrees with respect to the axis of symmetry of the plasma.

DETAILED DESCRIPTION OF THE DISCLOSURE

Figure 1A:
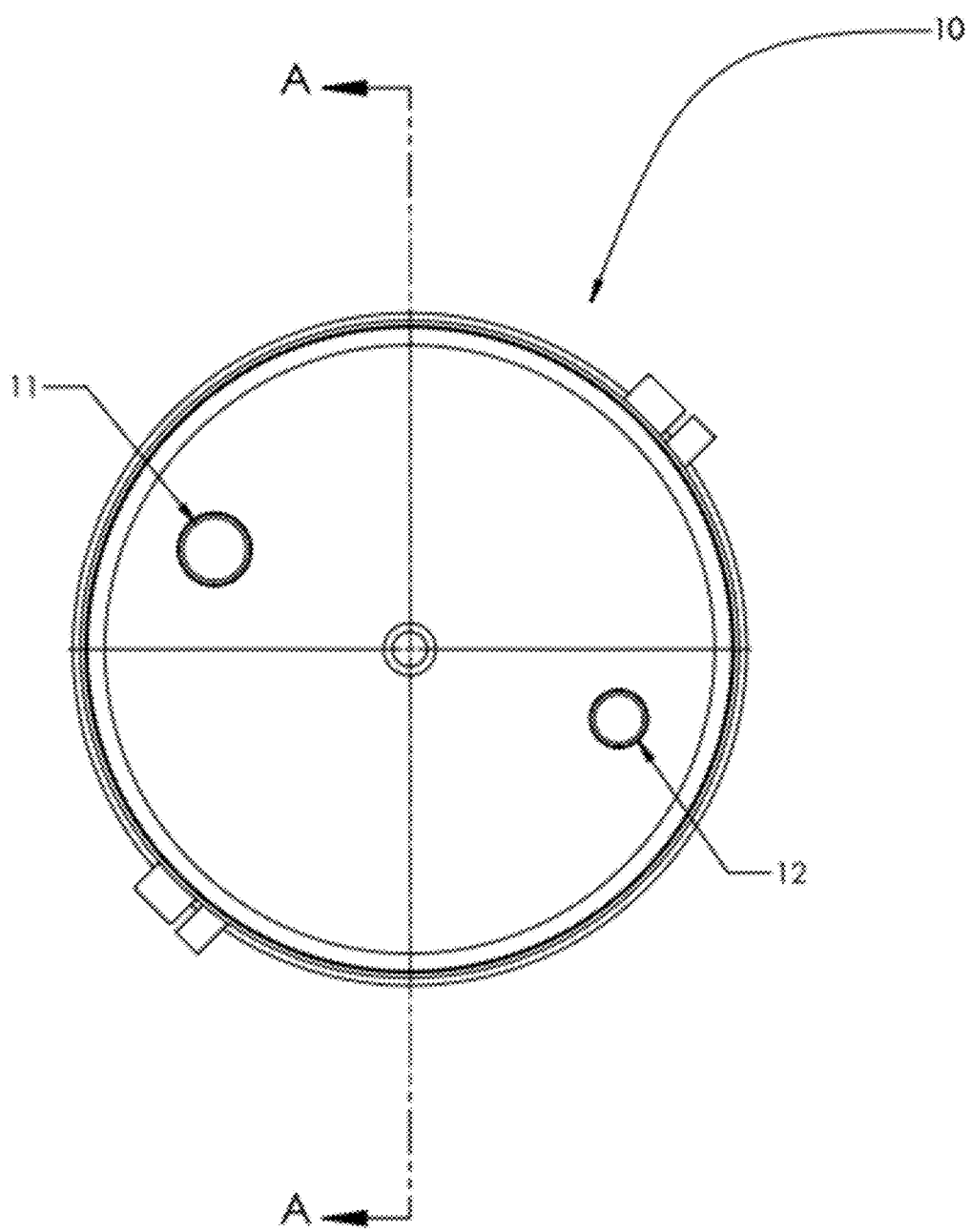
FIG. 1A is a top view and FIG. 1B is a cross-sectional view along the lines of A-A of FIG. 1A showing a thermal enclosure (oven) used to carry out the thermal treatment.

The expression "graphene nanosheets" as used herein refers to crumpled graphene nanosheets having structures comprising one or more stacked layers of one-atom-thick sheets of $sp^2$-bonded carbon atoms arranged in a honeycomb lattice. A least a portion of these stacked sheets are curled, curved or buckled, giving them a 3D morphology. Such particles are also known as graphene nanoplatelets (GNP), graphene nanoflakes, crumpled graphene, few-layer graphene, graphenic carbon particles or simply graphene. For example, graphene nanosheets can refer to particles composed of 10 layers or less and displaying high B.E.T. specific surface area ($\geq 250$ $m^2/g$) as measured by ASTM D 3663-78 standard (Brunauer et al.). The particles have a thickness ranging between 0.5-10 nm and widths typically greater than or equal to 50 nm, and thus display a high aspect ratio of at least 5:1 but typically greater or equal than 10:1. The particles, when analyzed using Raman spectroscopy with an incident laser wavelength of 514 nm, display the typical D, G and 2D bands (located at about 1350 $cm^{-1}$, 1580 $cm^{-1}$ 2690 $cm^{-1}$ respectively) and a G/D ratio greater or equal than 3 (G/D$\geq$3) as well as a 2D/G ratio greater or equal than 0.8 (2D/G$\geq$0.8). As used herein, the G/D and 2D/G ratios refer to the ratios of the peak intensity of these bands. Graphene nanosheets can for example be made from plasma torch processes as described in U.S. Pat. Nos. 8,486,363, 8,486,364 and 9,221,688 as well as provisional application No. U.S. 62/437,057. These documents are hereby incorporated by reference in their entirety.

The expression "aspect ratio" as used herein refers to the ratio of the longest dimension of the graphene particle to the shortest dimension of the graphene particle. For example, a graphene particle having an average width of 100 nm and an average thickness of 2 nm has an aspect ratio of 50:1.

The expression "polyaromatic hydrocarbon", "PAH" or "PAHs" as used herein refers to a group of chemicals that are formed during the incomplete burning of coal, oil, gas, wood, garbage, or other organic substances, such as tobacco and charbroiled meat. There are more than 100 different PAHs. PAHs generally occur as complex mixtures (for example, as part of combustion products such as soot), not as single compounds. They can also be found in substances such as for example crude oil, coal, coal tar pitch, creosote, and roofing tar. The list of PAHs includes but is not limited to Biphenylene, Acenaphthylene, Phenanthrene, Anthracene, Fluoranthene, Pyrene, Xylenes, Napthalene, Benzo(A) Pyrene (BaP), Benzo[E]pyrene (BeP), Benzo[a]anthracene (BaA), Chrysen (CHR), Benzo[b]fluoranthene (BbFA), Benzo[j]fluoranthene (BjFA), Benzo[k]fluoranthene (BkFA), and Dibenzo[a,h]anthracene (DBAhA).

The expression "reactive atmosphere" or "reactive environment" as used herein refers for example to an oxidative atmosphere or a reducing atmosphere.

The terms "oxidative atmosphere" or "oxidative environment" as used herein refer to atmospheres containing at least one oxidation agent as described herein.

The expression "oxidation agent" as used herein refers to a gas mixture comprising, but not limited to: air, oxygen, ozone, peroxides (such as hydrogen peroxide), $F_2$, $CO_2$, $H_2O$, $NO_2$, $Cl_2$, or oxidizing acids such as alcohols, sulfuric acid, perchloric acid, persulfates acid, hypohalites (such as sodium hypochlorite), mixtures thereof. The gas mixture can also comprise a noble gas (such as Ar) or $N_2$.

The expressions "reducing atmosphere" or "reducing environment" as used herein refer to atmospheres containing at least one reducing agent as described herein.

The expression "reduction agent" as used herein refers to $NH_4$, $H_2$, $H_2S$, CO, and mixtures thereof.

The concentration of polyaromatic hydrocarbons in a graphene sample can be determined quantitatively for example by Soxhlet extraction in toluene, followed by analysis using gas chromatography mass spectrometry (GC/MS), as is common for the quantification of Benzo-α-Pyrene (BaP) in carbon black samples. A standard method to quantify polyaromatic hydrocarbons in carbon samples is described by the standard ASTM D7771-17, "Standard Test Method for Determination of Benzo-α-Pyrene (BaP) Content in Carbon Black". While this standard focuses on Benzo-α-Pyrene (BaP), the measurement method can be used for other compounds of the PAH family. Our concentration in percent PAHs reported is the sum of all detected PAHs. Our Soxhlet extractions were typically only about 4-6 hours compared with 16 hours for the ASTM standard. The Soxhlet was set up for high efficiency extraction with rapid fill/drain cycles. The eluent was colorless prior to the extraction being terminated. The extract was not concentrated but analyzed directly by GC/MS and compared with commercially available standard PAH mixtures. The detection limit of this method is of the order of 35-90 ppm PAH (0.0035-0.0090% PAH by weight).

The expression "tap density" as used herein refers to a measurement obtained by mechanically tapping a graduated cylinder containing a sample until little further volume change is observed, as described by the ASTM standard B527-15 "Standard Test Method for Tap Density of Metal Powders and Compounds". The tapped density is calculated as mass divided by the final volume of the powder (e.g. $g/cm^3$).

The expression "thermally produced" as used herein refers to graphene nanosheets that were produced by a plasma process. Examples are described in U.S. Pat. Nos. 8,486,363, 8,486,364 and 9,221,688 as well as provisional application No. U.S. 62/437,057, all of which are hereby incorporated by reference in their entirety.

The "substantially unchanged" as used herein when referring to the tap density means that following a thermal reactive treatment described herein, the tap density of the treated graphene nanosheets will be increased or decreased by less than about 10%, 9%, 8%, 7%, 6%, 5%, 4%, 3%, 2% or 1%.

The expression "carbon-containing substance" as used herein refers to a compound or substance that comprises at least one carbon atom.

The expression "thermal zone" as used herein refers to a thermal zone that can be generated for example by a quasi-thermal plasma, for example, a plasma that is close to local thermodynamic equilibrium (LTE), formed by, for example, an inductively coupled plasma torch (ICP), a direct-current plasma torch (DC-plasma), an alternative-current plasma (AC-plasma) or a microwave plasma torch or any other suitable way to generate a hot gas in the plasma state. A plasma is close to LTE at high pressure (typically over 100 torr), where collisions between electrons, ions, neutrals and radicals are frequent.

The term "supplied plasma torch power" as used herein refers to the power supplied to the plasma torch. The supplied power is greater than or equal to the power in the plasma as plasma torches are not 100 percent efficient at transferring the supplied power to the plasma gas.

The term "quench gas to carbon ratio" as used herein refers to the volume per unit of time of quench gas, for example standard liter per minute (slpm) of gas injected, for the volume per unit of time (for example slpm) of a carbon-containing substance, for example a carbon-containing gas injected. The term "quench gas to carbon ratio" as used herein also refers to the volume per unit of time of quench gas to the number of moles of carbon injected (1 mole of carbon is equal to 12 grams of carbon). The "quench gas to carbon ratio" as used herein also refers to the mass per unit of time (for example gram per second or gram per minute) of quench gas injected into the reactor to the mass per unit of time (for example gram per second or gram per minute) of a carbon-containing substance.

As used herein, the term "quench gas" refers to and can comprise any non-carbon containing gas with a high thermal conductivity at STP greater than or equal to 17.9 milli-Watt per meter per degree Kelvin (the thermal conductivity of Argon at STP; see E. W. Lemmon and R. T Jacobsen). The quench gas may for example be composed of argon, helium, hydrogen, nitrogen or any other gas with a thermal conductivity greater than or equal to 17.9 mW/m·K, or any mixture of these gases. A person skilled in the art will understand that the thermal conductivity of the gas is determinant for the quench rate of the reactants. The quench gas will typically be injected close to or inside the plasma torch but can be injected elsewhere in the reactor as well as in multiple layers or multiple locations. As used herein, the "quench gas" also refers to a sheath gas injected next to the plasma gas in a RF-plasma or DC-plasma torch and used to protect the torch components from thermal shock and degradation (see FIGS. 5 and 6).

As used herein, all gas volumes and velocities are, unless specified otherwise, meant to denote quantities at standard temperature and pressure (STP). The person skilled in the art will readily understand that these values change at high temperature and high pressure experienced in the plasma torch.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The present disclosure relates to graphene nanosheets having a low content of polyaromatic hydrocarbons without having undergone a processing step in the liquid phase, such as a soxhlet extraction. These graphene nanosheets may display a low tap density below about 0.06 g/cm$^3$, as described by the ASTM standard B527-15 "Standard Test Method for Tap Density of Metal Powders and Compounds". The PAH concentration in this material can be less than about 0.3% by weight, less than about 0.1% by weight, less than about 0.01% by weight, or less than the detection limit of the gas chromatography mass spectrometry (GC/MS) apparatus. The graphene nanosheets can feature a Raman G/D ratio greater than or equal to about 2, a 2D/G ratio greater than or equal to about 0.8 (when measured using an incident laser with a wavelength of 514 nm) and a specific surface area (B.E.T.) of about 250 m$^2$/g or greater. The tap density of the graphene nanosheets will typically be between about 0.03 and about 0.05 g/cm$^3$. In accordance with embodiments of the present disclosure, the thermally produced graphene nanosheets may be produced by processes and methods as disclosed for example in U.S. Pat. Nos. 8,486,363, 8,486,364 and 9,221,688, which are hereby incorporated herein by reference in their entirety.

A method to obtain graphene nanosheets comprising a low PAH content comprises exposing the graphene nanosheets containing PAHs to a thermal treatment at a temperature greater than 200° C. or greater than 300° C. in an atmosphere containing a reactive species, for example an oxidative species such as oxygen. The duration of this heat treatment under oxidative environment can be applied for a duration of one hour or more. The temperature in the enclosure (e.g. the oven) containing the carbon nanoparticles or graphene can be raised gradually, and the gaseous atmosphere can be a mixture of an inert gas and a reactive species. For example, when the reactive species is an oxidative species, the gas mixture can be a mixture of nitrogen and oxygen, a mixture of argon and oxygen, air, a mixture of argon, nitrogen and oxygen, or any other mixture of an oxidative species and inert species. The reactive species can also be a reducing species. The pressure in the enclosure can be below atmospheric pressure (a partial vacuum), at atmospheric pressure or above atmospheric pressure. For example, the treatment can be carried out in vacuum or at high pressure in an oxidizing atmosphere (e.g., air, a mixture of oxygen and argon or a mixture or oxygen and nitrogen, or any other gas mixture containing an oxidation agent), such that the PAH or a portion thereof is removed. The graphene nanosheets can be subjected to a sufficient temperature on the order of from about 300° C. to about 500° C. (or higher, such as 500° C. to 650° C.). The heating can occur for any time sufficient to achieve the removal of the PAH. The heating can occur in any type of furnace or other device capable of subjecting particulates to heat under a reactive atmosphere and preferably at atmospheric pressure. The temperature can be from 200° C. to 500° C., such as 290° C. to 500° C., or 400° C. to 500° C. Temperatures above 500° C. may be used, such as 500° C. to 650° C. or from 500° C. to 650° C. or higher. A person skilled in the art will appreciate that graphene particles can be oxidized and be burned and destroyed in oxidative environments at temperatures above 600° C. A person skilled in the art will appreciate that exposing the graphene particles to higher temperature at lower oxygen concentration can have a similar effect as exposing the particles to lower temperatures and higher oxygen concentrations.

The graphene nanosheets resulting from the process presently disclosed feature a PAH concentration below 0.01% by weight, a Raman G/D ratio greater than or equal to 2, a 2D/G ratio greater than or equal to 0.8 (when measured using an incident laser with a wavelength of 514 nm) and a specific surface area (BET) of 250 m$^2$/g or greater.

For example, the graphene nanosheets have a tap density of less than about 0.06 g/cm$^3$, as measured by ASTM B527-15 standard.

For example, the graphene nanosheets have a tap density of less than about 0.04 g/cm$^3$, as measured by ASTM B527-15 standard.

For example, the graphene nanosheets have a tap density of about 0.03 to about 0.05 g/cm$^3$, as measured by ASTM B527-15 standard.

For example, the graphene nanosheets have a tap density of about 0.03 to about 0.04 g/cm$^3$, as measured by ASTM B527-15 standard.

For example, the graphene nanosheets have a tap density of about 0.03 g/cm$^3$, as measured by ASTM B527-15 standard.

For example, the graphene nanosheets have a specific surface area (B.E.T) greater than about 250 m$^2$/g.

For example, the graphene nanosheets have a specific surface area (B.E.T) greater than about 300 m$^2$/g.

For example, the graphene nanosheets have a specific surface area (B.E.T) greater than about 350 m$^2$/g.

For example, the graphene nanosheets have a specific surface area (B.E.T) of about 250 to about 600 m$^2$/g.

For example, the graphene nanosheets have a specific surface area (B.E.T) of about 300 to about 600 m$^2$/g.

For example, the graphene nanosheets have a specific surface area (B.E.T) of about 400 to about 600 m$^2$/g.

For example, the graphene nanosheets have a specific surface area (B.E.T) of about 500 to about 600 m$^2$/g.

For example, the graphene nanosheets have a polyaromatic hydrocarbon concentration of less than about 500 ppm.

For example, the graphene nanosheets have a polyaromatic hydrocarbon concentration of less than about 400 ppm.

For example, the graphene nanosheets have a polyaromatic hydrocarbon concentration of less than about 200 ppm.

For example, the graphene nanosheets have a polyaromatic hydrocarbon concentration of less than about 100 ppm.

For example, the graphene nanosheets have a polyaromatic hydrocarbon concentration of less than about 90 ppm.

For example, the graphene nanosheets have a polyaromatic hydrocarbon concentration of less than about 80 ppm.

For example, the graphene nanosheets have a polyaromatic hydrocarbon concentration of less than about 70 ppm.

For example, the graphene nanosheets have a polyaromatic hydrocarbon concentration of less than about 60 ppm.

For example, the graphene nanosheets have a polyaromatic hydrocarbon concentration of less than about 50 ppm.

For example, the graphene nanosheets have a polyaromatic hydrocarbon concentration of less than about 40 ppm.

For example, the graphene nanosheets have a polyaromatic hydrocarbon concentration below 35 ppm.

For example, the graphene nanosheets have a polyaromatic hydrocarbon concentration of less than about 0.6% by weight.

For example, the graphene nanosheets have a polyaromatic hydrocarbon concentration of less than about 0.5% by weight.

For example, the graphene nanosheets have a polyaromatic hydrocarbon concentration of less than about 0.4% by weight.

For example, the graphene nanosheets have a polyaromatic hydrocarbon concentration of less than about 0.3% by weight.

For example, the graphene nanosheets have a polyaromatic hydrocarbon concentration of less than about 0.2% by weight.

For example, the graphene nanosheets have polyaromatic hydrocarbon concentration of less than about 0.1% by weight.

For example, the graphene nanosheets have a polyaromatic hydrocarbon concentration of less than about 0.01% by weight.

For example, the graphene nanosheets have a polyaromatic hydrocarbon concentration of about 0.01% to about 0.7%.

For example, the graphene nanosheets have a polyaromatic hydrocarbon concentration of about 0.01% to about 0.5%.

For example, the graphene nanosheets have a polyaromatic hydrocarbon concentration of about 0.01% to about 0.3%.

For example, the graphene nanosheets have a polyaromatic hydrocarbon concentration of about 0.1% to less than about 0.3% by weight.

For example, the graphene nanosheets have a polyaromatic hydrocarbon concentration of about 0.01% to about 0.1%.

For example, the graphene nanosheets have a polyaromatic hydrocarbon concentration of about 0.15% to less than about 0.25% by weight.

For example, the graphene nanosheets have a polyaromatic hydrocarbon concentration of about 0.1% to about 0.6% by weight.

For example, the graphene nanosheets have a polyaromatic hydrocarbon concentration of about 0.05% to about 0.6% by weight.

For example, the graphene nanosheets have a polyaromatic hydrocarbon concentration of about 0.05% to about 0.5% by weight.

For example, the graphene nanosheets have a polyaromatic hydrocarbon concentration of about 0.1% to about 0.5% by weight.

For example, the graphene nanosheets have a polyaromatic hydrocarbon concentration of about 0.01% to about 0.4% by weight.

For example, the graphene nanosheets have a polyaromatic hydrocarbon concentration of about 0.05% to about 0.4% by weight.

For example, the graphene nanosheets have a polyaromatic hydrocarbon concentration of about 0.1% to about 0.4% by weight.

For example, the graphene nanosheets have a polyaromatic hydrocarbon concentration of about 0.05% to about 0.3% by weight.

For example, the graphene nanosheets have a polyaromatic hydrocarbon concentration below detection limit, as measured by gas chromatography mass spectrometry (GC/MS) or by Soxhlet extraction method according to ASTM D7771-11.

For example, the graphene nanosheets have a Raman G/D ratio greater than or equal to about 3 and a 2D/G ratio greater than or equal to about 0.8, as measured using an incident laser wavelength of 514 nm. Graphene nanosheets having a Raman G/D ratio greater than or equal to about 2.5 and a 2D/G ratio greater than or equal to about 0.8, as measured using an incident laser wavelength of 514 nm, wherein the graphene nanosheets have a polyaromatic hydrocarbon concentration of less than about 0.7% by weight.

For example, the graphene nanosheets have a tap density of less than about 0.06 g/cm$^3$, as measured by ASTM B527-15 standard.

For example, the graphene nanosheets are thermally produced.

For example, the volatile impurities are polyaromatic hydrocarbons.

For example, the reactive atmosphere is an oxidative atmosphere.

For example, the oxidative atmosphere comprises an oxidation agent chosen from air, water vapor, oxygen, ozone, peroxides, $F_2$, $CO_2$, $H_2O$, $NO_2$, $Cl_2$, alcohols, sulfuric acid, perchloric acid, persulfates acid, hypohalites, halogens, oxyhalides, nitrous oxides and mixtures thereof.

For example, the oxidative atmosphere comprises an inert gas and an oxidation agent.

For example, the inert gas is nitrogen, argon helium, neon, krypton, xenon or a mixture thereof.

For example, the gas mixture comprises oxygen and argon.

For example, the process comprises injecting a gas mixture comprising oxygen into an enclosure containing the graphene nanosheets.

For example, the gas mixture is injected under constant flow.

For example, the gas mixture is injected under constant flow of about 1-10 slpm.

For example, the reactive atmosphere is a reductive atmosphere.

For example, the reductive atmosphere comprises $NH_4$, $H_2$, $H_2S$, CO, and mixtures thereof.

For example, the reductive atmosphere comprises an inert gas and a reducing agent.

For example, the process is effective for lowering a polyaromatic hydrocarbon concentration below about 2% in the graphene nanosheets.

For example, the process is effective for lowering a polyaromatic hydrocarbon concentration below about 1% in the graphene nanosheets.

For example, the graphene nanosheets are heated at a temperature of at least about 300° C.

For example, the graphene nanosheets are heated at a temperature of at least about 400° C.

For example, the graphene nanosheets are heated at a temperature of at least about 500° C.

For example, the graphene nanosheets are heated at a temperature of at least about 600° C.

For example, the graphene nanosheets are heated at a temperature of about 200° C. to about 1000° C.

For example, the graphene nanosheets are heated at a temperature of about 200° C. to about 750° C.

For example, the graphene nanosheets are heated at a temperature of about 300° C. to about 550° C.

For example, the process is carried out under atmospheric pressure.

For example, the process is carried out under below atmospheric pressure or under partial vacuum.

For example, the process is carried out under above atmospheric pressure.

For example, the specific surface area (B.E.T) is increased by at least 20%.

For example, specific surface area (B.E.T) is increased by at least 30%.

For example, the specific surface area (B.E.T) is increased by at least 40%.

For example, the specific surface area (B.E.T) is increased by at least 50%.

For example, the specific surface area (B.E.T) is increased by at least 60%.

For example, the specific surface area (B.E.T) is increased by at least 70%.

For example, the specific surface area (B.E.T) is increased by at least 80%.

For example, the specific surface area (B.E.T) is increased by at least 90%.

For example, the specific surface area (B.E.T) is increased by at least 100%.

For example, the process is carried out in the absence of a liquid or solvent.

For example, the process is a dry process.

For example, the process is a continuous process.

For example, the process is carried out in a fluidized bed reactor.

For example, the process is carried out in a rotating oven.

For example, the process is a batch process.

For example, the tap density, as measured by ASTM B527-15 standard, of the graphene nanosheets remains substantially unchanged.

For example, the tap density of the graphene nanosheets is increased or decreased by less than 5%, as measured by ASTM B527-15 standard.

For example, the tap density of the graphene nanosheets is increased or decreased by less than 10%, as measured by ASTM B527-15 standard.

For example, the polyaromatic hydrocarbon is chosen from Biphenylene, Acenaphthylene, Phenanthrene, Anthracene, Fluoranthene, Pyrene, Xylenes, Napthalene, Benzo(A) Pyrene (BaP), Benzo[E]pyrene (BeP), Benzo[a]anthracene (BaA), Chrysen (CHR), Benzo[b]fluoranthene (BbFA), Benzo[j]fluoranthene (BjFA), Benzo[k]fluoranthene (BkFA), Dibenzo[a,h]anthracene (DBAhA), and mixtures thereof.

For example, the polyaromatic hydrocarbon is chosen from Biphenylene, Acenaphthylene, Phenanthrene, Anthracene, Fluoranthene, Pyrene, Xylenes, Napthalene, Benzo(A) Pyrene (BaP), Benzo[E]pyrene (BeP), Benzo[a]anthracene (BaA), Chrysen (CHR), Benzo[b]fluoranthene (BbFA), Benzo[j]fluoranthene (BjFA), Benzo[k]fluoranthene (BkFA), Dibenzo[a,h]anthracene (DBAhA), and mixtures thereof.

For example, the graphene nanosheets are quenched with a quench gas having a temperature below 1300° C.

For example, the graphene nanosheets are quenched with a quench gas having a temperature below 900° C.

For example, the graphene nanosheets are quenched with a quench gas having a temperature below 600° C.

For example, the graphene nanosheets are quenched with a quench gas having a temperature below 300° C.

For example, the graphene nanosheets are quenched with a quench gas having a temperature below 100° C.

For example, the carbon-containing substance is injected at a quench gas to carbon ratio of at least 50 slpm of quench gas per mole of carbon per minute.

For example, the carbon-containing substance is injected at a quench gas to carbon ratio of at least 160 slpm of quench gas per mole of carbon per minute.

For example, the carbon-containing substance is injected at a quench gas to carbon ratio of at least 250 slpm of quench gas per mole of carbon per minute.

For example, the carbon-containing substance is injected at a quench gas to carbon ratio of about 50 slpm to about 125 slpm of quench gas per mole of carbon per minute.

For example, the carbon-containing substance is injected at a quench gas to carbon ratio of about 100 slpm to about 250 slpm of the quench gas per mole of carbon per minute.

For example, the injecting of the carbon-containing substance being carried out using a plurality of jets.

For example, the injecting of the carbon-containing substance being carried out using at least 3 jets.

For example, the injecting of the carbon-containing substance being carried out using at least 4 jets.

For example, the injecting of the carbon-containing substance being carried out using at least 5 jets.

For example, the injecting of the carbon-containing substance being carried out using more than 5 jets.

For example, the graphene nanosheets are produced at a rate of at least 120 g/h.

For example, the graphene nanosheets are produced at a rate of at least 150 g/h.

For example, the graphene nanosheets are produced at a rate of at least 200 g/h.

For example, the graphene nanosheets are produced at a rate of at least 250 g/h.

For example, the graphene nanosheets are produced at a rate of about 120 to about 150 g/h.

For example, the graphene nanosheets are produced at a rate of about 150 to about 250 g/h.

For example, the graphene nanosheets are quenched with a quench gas fed at a rate of at least 3 slpm of the quench gas per kW of supplied torch power.

For example, the graphene nanosheets are quenched with a quench gas fed at a rate of at least 1 slpm of the quench gas per kW of supplied torch power.

For example, the graphene nanosheets are quenched with a quench gas fed at a rate of at least 0.5 slpm of the quench gas per kW of supplied torch power.

For example, the graphene nanosheets are quenched with a quench gas fed at a rate of about 0.5 slpm to about 1.5 slpm of the quench gas per kW of supplied torch power.

For example, the graphene nanosheets are quenched with a quench gas fed at a rate of about 1.5 slpm to about 4 slpm of the quench gas per kW of supplied torch power.

For example, the graphene nanosheets are produced at a rate of at least 1 g/kWh of supplied plasma torch power.

For example, the graphene nanosheets are produced at a rate of at least 2.5 g/kWh of supplied plasma torch power.

For example, the graphene nanosheets are produced at a rate of at least 3 g/kWh of supplied plasma torch power.

For example, the graphene nanosheets are produced at a rate of at least 5 g/kWh of supplied plasma torch power.

For example, the graphene nanosheets are produced at a rate of about 2 to about 3 g/kWh of supplied plasma torch power.

For example, the graphene nanosheets are produced at a rate of about 3 to about 5 g/kWh of supplied plasma torch power.

For example, the carbon-containing substance is a carbon-containing gas.

For example, carbon-containing gas is a $C_1$-$C_4$ hydrocarbon.

For example, the carbon-containing gas is chosen from methane, ethane, ethylene, acetylene, vinyl chloride propane, propene, cyclopropane, allene, propyne, butane, 2-methylpropane, 1-butene, 2-butene, 2-methylpropene, cyclobutane, methylcyclopropane, 1-butyne, 2-butyne, cyclobutene, 1,2-butadiene, 1,3-butadiene or 1-buten-3-yne or a mixture thereof.

For example, the carbon-containing substance is a carbon-containing liquid.

For example, carbon-containing liquid is a $C_5$-$C_{10}$ hydrocarbon.

For example, the carbon-containing liquid is chosen from n-propanol, 1,2-dichloroethane, allyl alcohol, propionaldehyde, vinyl bromide, pentane, hexane, cyclohexane, heptane, benzene, toluene, xylene or styrene or mixtures thereof.

For example, the carbon-containing substance is methane or natural gas.

For example, the carbon-containing substance is a carbon-containing solid.

For example, the carbon-containing solid is chosen from graphite, carbon black, norbornylene, naphthalene, anthracene, phenanthrene, polyethylene, polypropylene, or polystyrene or mixtures thereof.

For example, the carbon-containing gas, carbon-containing liquid or carbon-containing solid is in admixture with a carrier gas.

For example, the carrier gas comprises an inert gas.

For example, the inert gas is chosen from argon, helium, nitrogen, hydrogen or a mixture thereof.

For example, the quench gas is chosen from argon, helium, nitrogen, hydrogen or a mixture thereof.

For example, the quench gas comprises an inert gas.

For example, the quench gas comprises hydrogen.

For example, the quench gas comprises argon.

For example, the quench gas is fed at a rate of 1 to 10 slpm of gas for each kW of supplied plasma torch power.

For example, the thermal zone has a temperature of about 4000° C. to about 11 000° C.

For example, the thermal zone has a temperature of about 3000° C. to about 8000° C.

For example, the thermal zone has a temperature of about 2600° C. to about 5000° C.

For example, the carbon-containing substance is injected at a velocity of at least 70 m/s STP.

For example, the carbon-containing substance is injected at a velocity of at least 90 m/s STP.

For example, the carbon-containing substance is injected at a velocity of at least 100 m/s STP.

For example, the carbon-containing substance is injected at a velocity of about 60 to about 100 m/s STP.

For example, the carbon-containing substance is injected at a velocity of about 70 to about 90 m/s STP.

For example, the carbon-containing substance is injected at a velocity of about 75 to about 85 m/s STP.

For example, the process can be carried an injection angle of the carbon-containing substance that is about 10 to about 40, about 20 to about 30 degrees or about 25 degrees with respect to the axis of symmetry of the plasma.

For example, the process can be carried an injection angle of the carbon-containing substance that is about 15 to about 35, about 20 to about 30 degrees or about 25 degrees with respect to the axis of symmetry of the plasma.

For example, the process can be carried out using a plasma torch comprising multi-hole injector for injecting the carbon-containing substance, wherein for each of injector holes, injection velocity is at least 60 m/s STP and injection angle is about 15 to about 35 degrees with respect to the axis of symmetry of the plasma.

For example, the process can be carried out using a plasma torch comprising multi-hole injector for injecting the carbon-containing substance, wherein for each of injector holes, injection velocity is at least 60 m/s STP and injection angle is about 20 to about 30 degrees with respect to the axis of symmetry of the plasma.

For example, the process can be carried out using a plasma torch comprising multi-hole injector for injecting the carbon-containing substance, wherein for each of injector holes, injection velocity is at least 60 m/s STP and injection angle is about 25 degrees with respect to the axis of symmetry of the plasma.

For example, the quench gas is injected around the thermal zone.

For example, the process further comprises collecting the produced graphene nanosheets.

For example, the produced graphene nanosheets are collected in bag filters, on filter cartridges or with a cyclone.

For example, the graphene nanosheets have a B.E.T. specific surface area greater or equal than 250 m$^2$/g as measured by ASTM D 3663-78.

For example, the graphene nanosheets have an aspect ratio of at least 5:1.

For example, the graphene nanosheets have an aspect ratio of at least 10:1.

For example, the graphene nanosheets have a Raman G/D ratio of at least 3, as measured using an incident laser wavelength of 514 nm.

For example, the graphene nanosheets have a Raman 2D/G ratio of at least 0.8, as measured using incident laser wavelength of 514 nm.

For example, the supplied plasma torch power is greater than 35 kW.

For example, the supplied plasma torch power is greater than 100 kW.

For example, the supplied plasma torch power is greater than 200 kW.

For example, the supplied plasma torch power is greater than 1000 kW.

The following examples are non-limitative and are used to better exemplify the materials and processes of the present disclosure. The scope of the claims should not be limited by specific embodiments and examples provided in the disclosure, but should be given the broadest interpretation consistent with the disclosure as a whole.

EXAMPLES

Example 1: Thermal Treatment for Lowering Polyaromatic Hydrocarbon Content of Graphene Nanosheets In one exemplary embodiment, crumpled graphene nanosheets powder produced using an ICP plasma torch using methane as precursor (as described in U.S. provisional application No. 62/437,057) is treated in a dry process to remove the PAH. Prior to the gas-phase (dry) process, the produced crumpled graphene powder contains 0.16% wt. of PAH (as measured by Soxhlet extraction with toluene) and has a B.E.T. specific surface area of 302 m$^2$/g.

Figure 1B:
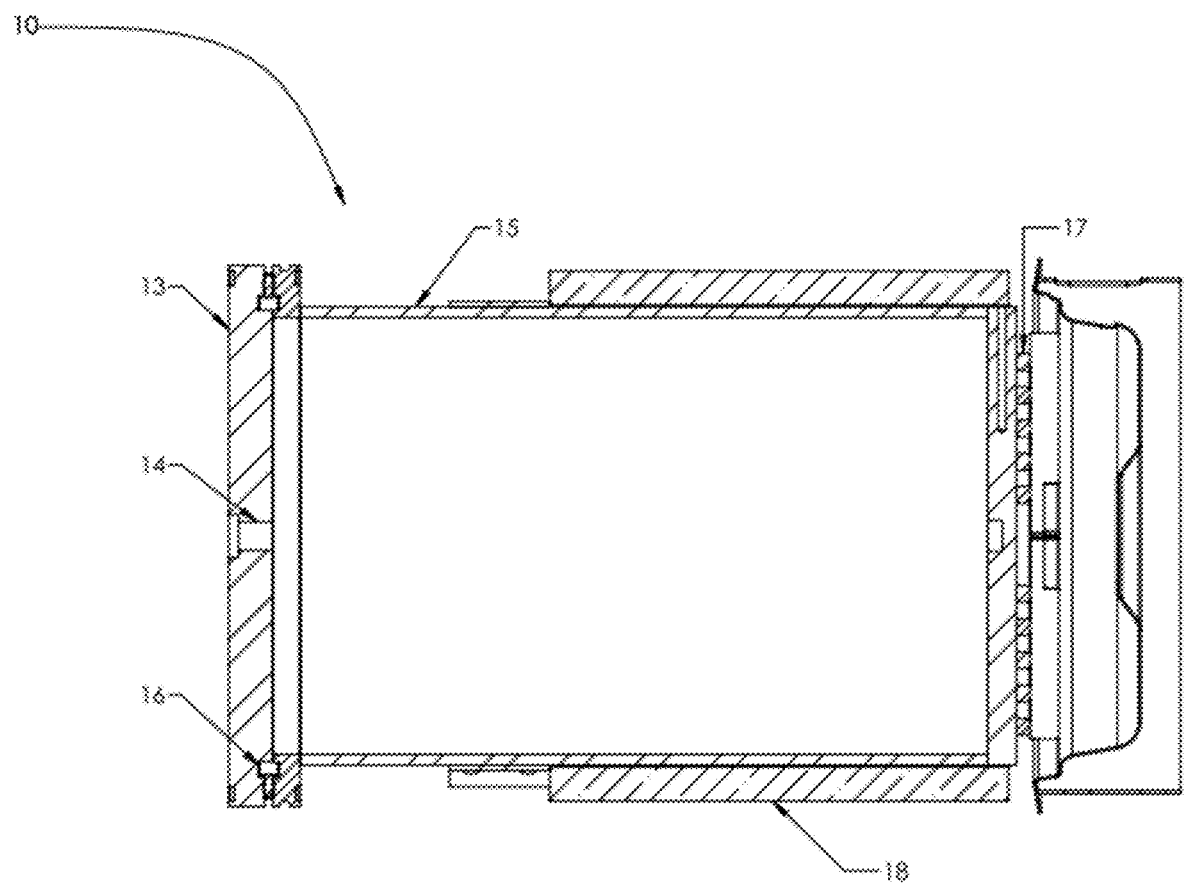

Referring now to FIG. 1A, the enclosure (oven) comprises a port (11) for injection of a mixture of gases as well as a port (12) for exhaust of a mixture of gases containing decomposed PAHs. Referring now to FIG. 1B, the enclosure comprises a flange (13) for containing both ports (12) and (13). Another port (14) is provided in the enclosure for inserting a shaft to mix the powder during the thermal oxidative treatment. The enclosure is contained in walls (15), comprises a groove (16) for o-rings to seal the enclosure, as well as bottom (17) and side (18) heating elements. A person skilled in the art will appreciated that all other suitable enclosures may be used for carrying out the processes disclosed herein.

The as-produced graphene nanosheets powder contains 0.16% wt. PAH (as measured by Soxhlet extraction with toluene) and has a B.E.T. specific surface area of 302 m$^2$/g. The gas-phase (dry) process to remove the PAH comprises a thermal oxidative treatment under a constant massive gas flow (3 slpm) comprising of a mixture of Ar and O2 (9% vol. O2). The temperature inside the heated enclosure is approximately 400° C. and the enclosure is held at atmospheric pressure. The gas flow is used to ensure that volatile components are removed and exhausted from the powder. A 1 hour ramp is used to reach 400° C., followed by a plateau of 40 minutes and approximately 2 hours of cooling. Between 10 g to 400 g were treated per run. The batch process can easily be converted to a continuous process, for example and without loss of generality, by using a fluidized bed thermal reactor or by passing the material to be treated through a rotating oven or through another heated zone using, for example, a conveyor belt. The quantity to be treated can easily be scaled-up by increasing the size of the oven, and thus the heated zone.

The thermal oxidative treatment evaporates and/or decomposes PAH present on the graphene nanosheets. The graphene nanosheets have a high graphitization state (high level of crystallinity) and do not suffer from significant mass loss during this thermal treatment. The weight loss during the treatment is related to the removal and destruction of PAH (thus to the initial concentration of the PAH). The following oxidation agents could, for example, be used instead of oxygen: air, water vapor, carbon dioxide, etc. A person skilled in the art will readily understand that the atmosphere used (composition of gas as well as pressure) as well as the quantity of material to be treated will determine the temperature as well as the duration to be used.

Disordered carbon has a rate of etching one order of magnitude higher than graphitized carbon. The tap density of the powder (as measured by ASTM standard B527-15) is not modified by the thermal oxidative treatment but an important increase in the B.E.T. specific surface area is measured (due to the removal of PAH blocking pores). A slight increase in the concentration of oxygen functional groups on the graphene surface can be observed (from approximatively 1 to 2% at. O/C as measured by XPS). After the treatment, the resulting graphene nanosheets contain no more measurable PAH (under the 90 ppm detection limit of the Soxhlet extraction method). After the treatment described in the present example, the B.E.T. specific surface area increased from 302 m$^2$/g prior to treatment to 567 m$^2$/g post treatment. For graphene with a higher Raman G/D ratio, we measured a change of B.E.T. specific surface area from 300 to 450 m$^2$/g, without significant mass loss.

Following the thermal oxidation treatment, there is an enhancement of specific B.E.T. specific surface area without measured weight loss (apart from the removed PAH fraction) and without change to the tap density. The increase in specific B.E.T. specific surface area is typically from about 20 to about 100%.

There are no noticeable changes in the relative ratios of the 3 main Raman bands (D, G and 2D bands) on the Raman spectra of the as-produced graphene as compared to the thermally treated material.

Example 2

In a second exemplary embodiment, a second type of oven is used to remove the PAH. The second oven used is a kiln furnace from Paragon with natural convection; the flow of air ($O_2/N_2$, 21/79% by volume) is not forced inside but results from natural convection due to the high and low temperature respectively inside and outside of the oven. Two circular openings (with diameters of about one half inch) are located on the side of the oven to allow natural convection to circulate and renew air in the oven. For this example, graphene nanosheets produced using an ICP plasma torch using methane as precursor gas (as described in provisional application 62/437,057) is treated in a gas-phase process to remove the PAH. For this example, the as-produced graphene contains 0.50% wt. PAH (as measured by Soxhlet extraction with toluene) and has a B.E.T. specific surface area of 288 $m^2/g$. The treatment is carried out at atmospheric pressure.

The temperature-time profile for this oven is as follows: from room temperature to 290° C. in 40 minutes, then from 290° C. to 440° C. in 20 minutes, followed by a plateau of 2 hours in duration at 440° C. and a slow cooling to room temperature (lasting about 2 hours). The material to be treated is positioned on multi-staged plates in the oven; each plate contains from 40 to 80 grams of evenly layered graphene powder (from 160 to 320 grams are treated per batch). Again this batch process can easily be converted to a continuous process.

After the treatment, the resulting graphene nanosheets contain no more measurable PAH (under the detection limit of the Soxhlet extraction method).and the B.E.T. specific surface area rises to 430 $m^2/g$. The tap density of the powder (as measured by ASTM standard B527-15) is not modified but an important increase in the B.E.T. specific surface area is measured, again without significant mass loss. A slight increase in the concentration of oxygen functional groups on the graphene surface can be observed (from 1% to 2% approximately as measured by XPS).

There are no noticeable changes in the relative ratios of the 3 main Raman bands (D, G and 2D bands) on the Raman spectra of the as-produced graphene as compared to the thermally treated material.

Example 3: Counter Example

Using the same as produced crumpled graphene powder from example 1 (PAH concentration of 0.16% wt. PAH, B.E.T. specific surface area of 302 $m^2/g$) and subjecting it directly (without the thermal oxidative treatment) to Soxhlet extraction with toluene, the final B.E.T. specific surface area was 329 $m^2/g$. Knowing that the precision of the specific surface area measurement is about ±10%, there is no significant change observed.

Following the Soxhlet extraction step (wet process), a change in the tap density of the crumpled graphene powder was observed. The tap density increased from 0.04 $g/cm^3$ to 0.11 $g/cm^3$. This supports that a wet process leads to an increase in tap density.

Subjecting this Soxhlet extracted sample (having a B.E.T. of 329 $m^2/g$) to a subsequent heat treatment step in pure argon atmosphere (at about 300° C. for 1.5 h) did not further increase the B.E.T. specific surface area. The further treated sample had a final B.E.T. specific surface area of 328 $m^2/g$. We conclude that this heat treatment without the presence of oxygen is not effective at increasing the specific surface area of the graphene, possibly by failing to remove the PAH from the graphene's pores.

Example 4: Preparation of Graphene Nanosheets

The starting material (graphene nanosheets) of some processes disclosed in the present disclosure can be prepared in various different manners. For example, graphene nanosheets can be prepared by using a thermal plasma process as disclosed below.

Figure 5:
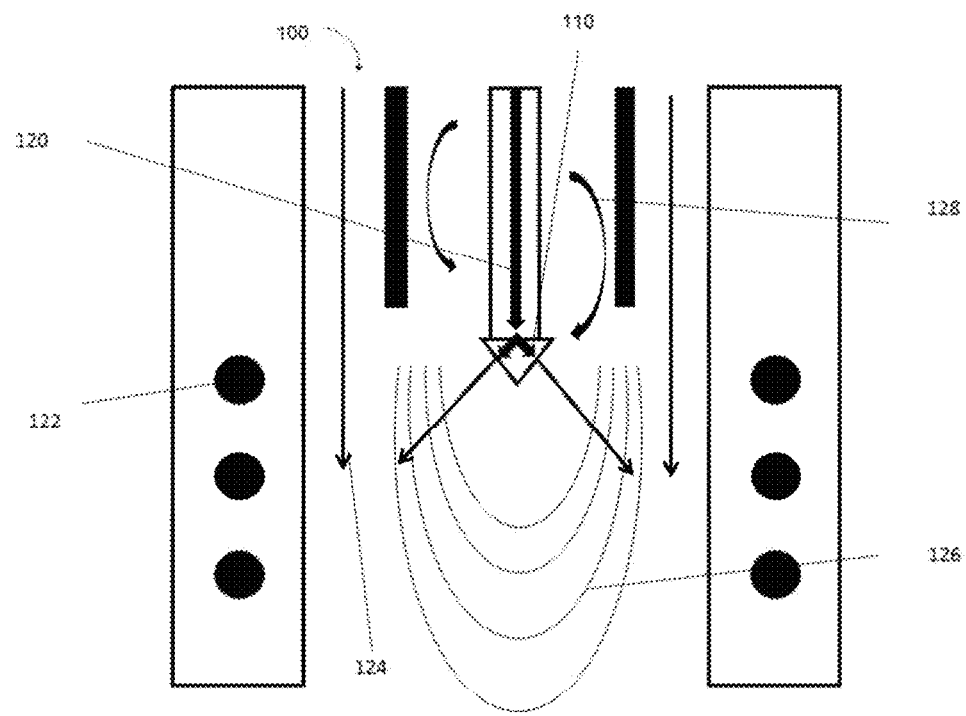
FIG. 5 shows the plasma torch with a multi-hole injector used in example 1 and the qualitative flow of the gases including the non-carbon containing gases and the carbon containing substance.

In one exemplary embodiment, the hydrocarbon precursor material is methane and it is injected into an inductively-coupled plasma torch (ICP) with a maximal plate power of 60 kW. FIG. 5 illustrates the ICP torch 100 as well as the qualitative flow of the gases including the non-carbon containing gases and the carbon containing substance.

For a power generator delivering 56 kW to an inductively coupled plasma torch (PN-50 model, Tekna, Sherbrooke, Québec, Canada), and as shown in FIG. 5, 20 slpm argon was used as central swirl gas 128, surrounded by a layer of quench gas (sheath gas) 124 consisting of 174 slpm of argon and 30 slpm of hydrogen gas. 33.6 slpm of natural gas (carbon feed gas) 120 was injected through the injector probe with the designed nozzle 110. Coils 122 conducting the radio frequency alternating current generate the plasma. Qualitative isotherm lines 126 are shown inside the plasma torch. The pressure in the reactor was 500 torr. The injection velocity was 80.6 m/s at standard temperature and pressure (STP). It is to be understood that in the plasma state of extreme temperature and pressure, these gas injection velocities are greater and the value must be corrected to take the different temperature and pressure values into consideration. A person skilled in the art will understand that this injection velocity value will increase when the process is scaled, for example for larger plasma volumes or larger plasma torch dimensions.

This process lasted 45 minutes and resulted in a graphene production rate of 225 g/h as measured from the weight of powder harvested downstream of the hot plasma zone, divided by the operation time needed to synthesize this powder.

The carbon injected is 33.6 slpm/22.4 l=1.5 Mole/min or 18 g/min of carbon.

The quench gas to carbon ratio is at least 120 liters STP of non-carbon gases to 1 Mole of carbon (also at least 180 slpm of non-carbon gases to 18 g/min of carbon; 10.0 liters of non-carbon gas for 1 g of carbon in gas form).

The carbon injected per amount of power is typically 33.6 slpm for a delivered torch power of 56 kW which equals 0.6 slpm C/kW of torch power.

Now referring to FIGS. 2A and 2B, the injector used is a multi-hole nozzle 10 comprising five injection holes 12, each hole having a 0.052 inch diameter. The nozzle 10 comprises a channel 16 for hydrocarbon feed and the surface of the nozzle 14 is perpendicular to the injection holes 12. This configuration provides an injection velocity of 80.6 m/s STP. The carbon gas injection angle is 25 degrees with respect to the axis of symmetry of the plasma. A person skilled in the art will understand that a water-cooled injection nozzle will provide longer wear resistance and enable long duration production runs with stable operating conditions.

The resulting product was high quality graphene nanosheets, as seen from the Raman spectra (as shown in FIG. 3). The specific surface area of the material (using the B.E.T. method), once PAH are removed, is 431 $m^2/g$. The Raman spectrum of the product features a 2D/G ratio of 1.3 and a G/D ratio of 4.7 when measured using an incident wavelength of 514 nm.

The carbon precursor is injected at high velocity of at least 60 m/s STP, typically 80 m/s STP, and even 100 m/s STP in order to limit residence time in the hot zone. This may be achieved by injecting a gas material, for example natural gas, through a showerhead-type nozzle with small holes, at an injection velocity that is greater than or equal to the velocity of the plasma gas. A high feed rate coupled to small holes leads to a high injection velocity and a short residence time in the hot zone.

Example 5: Counter Example

Figure 4:
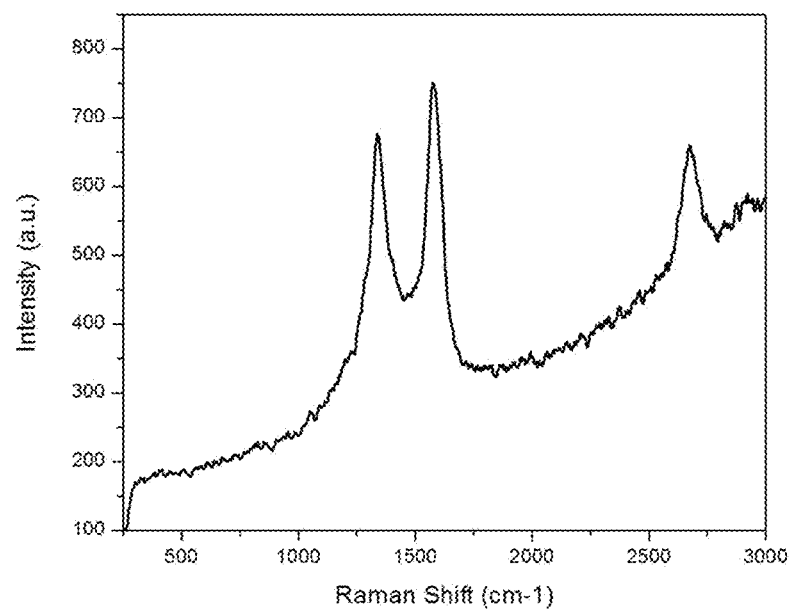
FIG. 4 is a plot of Raman spectra obtained with an incident wavelength of 514 nm from a sample produced using a single-hole injector and lower injection velocity (less than 60 m/s STP).
Figure 6:
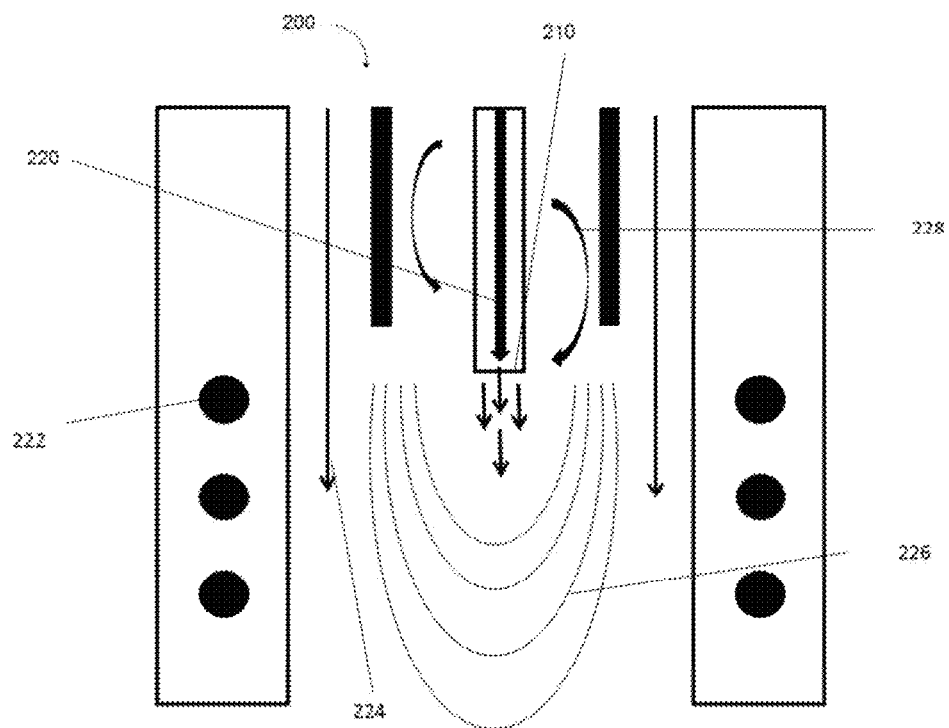
FIG. 6 shows the plasma torch with a single-hole injector used in example 2 and the qualitative flow of the gases including the non-carbon containing gases and the carbon containing substance.

Conversely, using similar parameters to those described above in Example 4, but injecting the methane with an injection velocity below 60 m/s STP using a single-hole nozzle, a significant fraction of carbon nodules and spheroidal carbon particles were produced leading to the typical Raman spectrum of acetylene black (as shown in FIG. 4). FIG. 6 illustrates the ICP torch 200 used in this counter example as well as the qualitative flow of the gases including the non-carbon containing gases and the carbon containing substance.

In this example, and as shown in FIG. 6, an injection velocity of 28.6 m/s STP was used. The carbon precursor gas feed rate was 34.7 slpm CH4, and the achieved production rate was 142 g/h. 20 slpm argon is used as central swirl gas 228, surrounded by a layer of quench gas (sheath gas) 224 consisting of 125 slpm of argon and 8 slpm of hydrogen gas. Otherwise the same method and apparatus were used as in Example 4. The carbon precursor gas 220 was injected through the injector probe without the designed nozzle 210 (e.g. with a single-hole nozzle). Coils 222 conducting the radio frequency alternating current generate the plasma. Qualitative isotherm lines 226 are shown inside the plasma torch.

The resulting material presents a low specific surface area (B.E.T.) of 150 $m^2$/g and a Raman spectra characteristic of thick graphitic nodules instead of thin graphenic particles (FIG. 4). The resulting particles display a Raman G/D ratio of 1.1 and a 2D/G ratio of 0.5 when measured using an incident wavelength of 514 nm. As illustrated in FIG. 6, the carbon precursor is injected into the hot zone via a single-hole probe without a designed nozzle, thus leading to a longer residence time in the hot zone, poor quenching efficiency and as a consequence the formation of acetylene-type carbon black (e.g. not graphene). The carbon precursor gas is injected at an angle of zero degrees with respect to the axis of symmetry of the plasma.

The embodiments of the paragraphs of the present disclosure are presented in such a manner in the present disclosure so as to demonstrate that every combination of embodiments, when applicable can be made. These embodiments have thus been presented in the description in a manner equivalent to making dependent claims for all the embodiments that depend upon any of the preceding claims (covering the previously presented embodiments), thereby demonstrating that they can be combined together in all possible manners. For example, all the possible combinations, when applicable, between the embodiments of any paragraphs and the processes and graphene nanosheets of THE SUMMARY are hereby covered by the present disclosure.

The scope of the claims should not be limited by specific embodiments and examples provided in the disclosure, but should be given the broadest interpretation consistent with the disclosure as a whole.

REFERENCES

1. Borm P J, et al., Formation of PAH-DNA adducts after in vivo and vitro exposure of rats and lung cells to different commercial carbon blacks, Toxicology and Applied Pharmacology, 2005 Jun. 1; 205(2): 157-167.
2. Jeongmin Lim et al., A study of $TiO_2$/carbon black composition as counter electrode materials for dye-sensitized solar cells. Nanoscale Research Letters 2013; 8(1): 227.
3. Stephen Brunauer, P. H. Emmett, Edward Teller, The Journal of the American Chemical Society 60 (1938) 309.
4. E. W. Lemmon and R. T Jacobsen, International Journal of Thermophysics, Vol. 25 (2004) 21-68.

What is claimed is:

1. Graphene nanosheets having a polyaromatic hydrocarbon concentration of less than about 0.7% by weight, wherein said graphene nanosheets have a Raman G/D ratio greater than or equal to about 2 and a 2D/G ratio greater than or equal to about 0.8, as measured using an incident laser wavelength of 514 nm.

2. Graphene nanosheets having a polyaromatic hydrocarbon concentration of less than about 0.7% by weight.

3. The graphene nanosheets of claim 2, wherein said graphene nanosheets have a tap density of less than about 0.04 g/$cm^3$, as measured by ASTM B527-15 standard.

4. The graphene nanosheets of claim 2, wherein said graphene nanosheets have a polyaromatic hydrocarbon concentration of less than about 500 ppm.

5. The graphene nanosheets of claim 2, wherein said graphene nanosheets have a polyaromatic hydrocarbon concentration of less than about 200 ppm.

6. The graphene nanosheets of claim 2, wherein said graphene nanosheets have a polyaromatic hydrocarbon concentration of less than about 70 ppm.

7. The graphene nanosheets of claim 2, wherein said graphene nanosheets have a polyaromatic hydrocarbon concentration of less than about 50 ppm.

8. The graphene nanosheets of claim 2, wherein said graphene nanosheets have a polyaromatic hydrocarbon concentration below 35 ppm.

9. Graphene nanosheets having a polyaromatic hydrocarbon concentration of about 0.01% to about 0.5%.

10. The graphene nanosheets of claim 9, wherein said graphene nanosheets have a tap density of less than about 0.06 g/$cm^3$, as measured by ASTM B527-15 standard.

11. The graphene nanosheets of claim 9, wherein said graphene nanosheets have a tap density of about 0.03 to about 0.05 g/$cm^3$, as measured by ASTM B527-15 standard.

12. The graphene nanosheets of claim 9, wherein said graphene nanosheets have a tap density of about 0.03 to about 0.04 g/$cm^3$, as measured by ASTM B527-15 standard.

13. The graphene nanosheets of claim 9, wherein said graphene nanosheets have a tap density of about 0.03 g/$cm^3$, as measured by ASTM B527-15 standard.

14. The graphene nanosheets of claim 9, wherein said graphene nanosheets have a specific surface area (B.E.T) greater than about 250 $m^2$/g.

15. The graphene nanosheets of claim 9, wherein said graphene nanosheets have a specific surface area (B.E.T) of about 250 to about 600 $m^2$/g.

16. The graphene nanosheets of claim 9, wherein said graphene nanosheets have a specific surface area (B.E.T) of about 400 to about 600 m²/g.

17. The graphene nanosheets of claim 9, wherein said graphene nanosheets have a polyaromatic hydrocarbon concentration of less than about 0.3% by weight.

18. The graphene nanosheets of claim 9, wherein said graphene nanosheets have a polyaromatic hydrocarbon concentration of less than about 0.2% by weight.

19. The graphene nanosheets of claim 9, wherein said graphene nanosheets have polyaromatic hydrocarbon concentration of less than about 0.1% by weight.

20. The graphene nanosheets of claim 9, wherein said graphene nanosheets have a Raman G/D ratio greater than or equal to about 3 and a 2D/G ratio greater than or equal to about 0.8, as measured using an incident laser wavelength of 514 nm. Graphene nanosheets having a Raman G/D ratio greater than or equal to about 2.5 and a 2D/G ratio greater than or equal to about 0.8, as measured using an incident laser wavelength of 514 nm, wherein said graphene nanosheets have a polyaromatic hydrocarbon concentration of less than about 0.7% by weight.

\* \* \* \* \*